United States Patent [19]

Pull

[11] Patent Number: 5,112,016
[45] Date of Patent: May 12, 1992

[54] PARKING PASS-CARD HANDLING DEVICE

[76] Inventor: Mark Pull, Box 342, Stonewall, Manitoba, Canada, ROC 2Z0

[21] Appl. No.: 695,987

[22] Filed: May 6, 1991

[51] Int. Cl.⁵ .............................................. A47F 5/00
[52] U.S. Cl. ................................ 248/309.1; 294/99.2
[58] Field of Search .................... 248/309.1, 689; 294/99.2, 99.1, 103.1, 33, 19 R; 70/456; 81/15.9, 487, 488

[56] References Cited

U.S. PATENT DOCUMENTS

| | | | |
|---|---|---|---|
| 1,200,158 | 10/1916 | Barrett | 81/487 |
| 1,425,447 | 8/1922 | Brundage | 81/487 |
| 1,948,932 | 2/1934 | McMickle | 248/689 X |
| 3,085,776 | 4/1963 | Mycock | 294/33 X |
| 4,247,140 | 1/1981 | Gordon | 294/33 X |
| 4,248,465 | 2/1981 | Halstead | 294/19 R |
| 4,330,936 | 5/1982 | Swarth | 294/99.2 X |
| 4,460,211 | 7/1984 | Pomeroy | 294/99.2 |

FOREIGN PATENT DOCUMENTS 34818  1/1912  Sweden ............... 294/99.2

Primary Examiner—J. Franklin Foss
Attorney, Agent, or Firm—Murray E. Thrift; Stanley G. Ade; Adrian D. Battison

[57] ABSTRACT

A card handling device is provided for manipulating a stiff card so that the card can be inserted into a card reader. The handling device has a long handle and a transverse card holding head at one end. An edge of the card fits frictionally into the channel in the head. The handling device is particularly useful for such card as those used for access to parking garages.

7 Claims, 1 Drawing Sheet

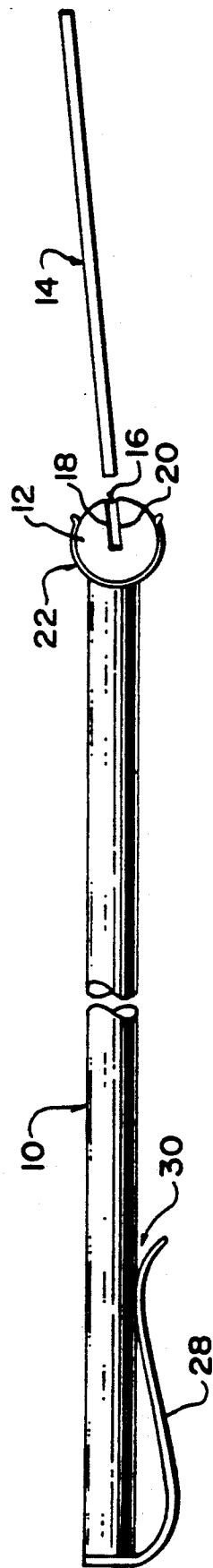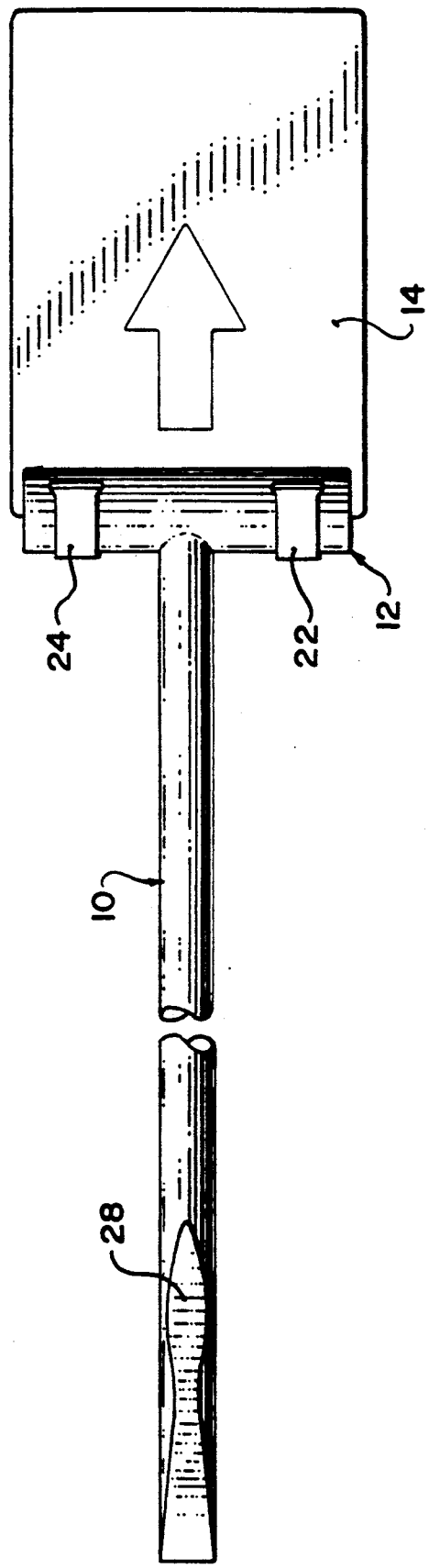

PARKING PASS-CARD HANDLING DEVICE

FIELD OF THE INVENTION

This invention relates to the field of card holders, more specifically to a parking pass-card handling device.

BACKGROUND OF THE INVENTION

Automobile parking lots are becoming increasingly more automated. It is very common to encounter devices at parking lot or garage entries that control entry and exit by means of reading an inserted pass-card. The use of this card allows entry to or exit from a parking lot or garage, usually by the raising of a gate or door. Passcards are used primarily by regular parking customers. The pass-card system is designed for quick entry and departure of regular parkers, however the system does have some faults.

The system is set up for the average size person in the average size car that is located properly on the road or ramp when using the parking lot card receiver. However, not all people, nor all cars, are of an average size. Many people experience difficulty in using the passcard and the parking lot automated system. People in small cars, or small people, are more likely to have problems inserting the card into the device with ease. It is common for people to exit the car in order to do so. This causes an obvious delay in that the person must put the car in "park", remove his or her seat belt, open the door, get out of the car, insert and remove the card, get back in the car, do up the seat belt, put the car in "drive" and proceed. There is an additional problem if the card receiver is located on a ramp, facing either upward or downward. There is, as well, obvious discomfort for the driver during inclement weather. Further, there is an obvious annoyance to people in cars lined up behind the person who must exit the car to use the device.

SUMMARY OF THE INVENTION

The present invention is concerned with an improved means of holding a parking pass-card firmly, while extending it beyond the normal reach of a person, to insert the card into a slot on a parking lot device, to allow entry into or departure from a parking lot.

According to the present invention there is provided a card handling device for manipulating a stiff card for insertion of the card into a card reader, the device comprising an elongate handle and engaging means at one end of the handle for engaging one end of the card.

As the device extends the normal reach of the driver of a car, there is no need to exit the vehicle, nor any need for undue physical exertion such as stretching or twisting one's body while attempting to insert the card into the slot of the computerized device. The preferred embodiment of the invention has a clip to hold the device to the sun visor of a vehicle, thereby storing the card and the handling device for easy access.

BRIEF DESCRIPTION OF THE DRAWINGS

In the accompanying drawings which illustrate an embodiment of this invention:

FIG. 1 is a side view of one embodiment, with card unattached; and

FIG. 2 is a top view of this embodiment, with card attached.

In the drawings like characters of reference indicate corresponding parts in the different figures.

DETAILED DESCRIPTION

The device illustrated represents one embodiment of this invention. The device has an elongate handle 10 with an integral transverse card holder 12 at one end. Both the card holder and the handle are made of a resilient molded plastic. The card holder is cylindrical in shape and has a channel 16 extending from one end of the holder to the other end. The channel forms two opposing walls 18 and 20.

Near each end on the card holder 12 there are spring loaded clips 22 and 24. The clips 22 and 24 clamp to the cylinder and cause the channel walls 18 and 20 to come together. The holder 12 of the device may also have recesses (not shown) thereon for the clips to allow for an easier attaching of the clips on the holder.

There is a resilient integral visor clip 28 on the handle 10 that serves as a means of attachment of the device to a sun visor within the vehicle. The clip 28 is constructed in a manner so that there is an opening 30 between the end of the clip 28 and the handle 10 to allow for the easing sliding attachment of the device onto the sun visor of the vehicle.

In use, parking pass card is inserted into the channel 16 on he card holder 12. The card is centrally positioned within the channel 16. The spring clips urge the channel closed onto the card and the card is thereby retained within the channel 16 on the holder 12 by the friction between the edge of the card 14 and the channel walls 18 and 20.

The device and attached card are held in place on the sun visor of the vehicle by the clip 28.

A most automated parking systems require that the card be inserted in a particular fashion, the end of the card that does not enter the slot on the system is fastened to the holder 12 within the channel 16.

In operation, the vehicle is driven along side a pass card machine. The driver grasps the handle 10 attached to the sun visor by sliding the clip away from the sun visor. While holding the handle 10 of the device, the driver extends his arm, with the devise in hand, out of the driver side window so that the attached card 14 is aligned and inserted into the receiving slot on the card receiver. The card 14 is inserted to the required depth within the machine, and then removed. A parking gate opens and the car is allowed to proceed. The driver easily replaces the device by clipping it to the sun visor.

While one embodiment of the invention has been described in the foregoing, it is to be understood that other embodiments are possible without departing from the spirit and scope of the invention. For example, other embodiments include a device with a telescopic handle, or an adjustable means of rotation between the holder and the handle. This allow the operator to pre-set his or her device to enter the slot on the machine from his or her car with minimal effort. The device may also be constructed so that it fits another convenient part of the interior of the automobile, such as the dash board, driver's door or inside roof.

The embodiments of the invention in which an exclusive property are privilege is claimed are defined as follows:

1. A card handling device for manipulating a stiff card for insertion of the card into a card reader, the device comprising an elongate handle and card engaging means at one end of the handle for engaging one end of the card, said card engaging means comprising a card engaging member extending transversely of the handle and channel means extending along the member for engaging and retaining an edge of the card.

2. A device as claimed in claim 1 in which the card engaging means releasably engages the card.

3. A device as claimed in claim 1 having mounting means for detachably mounting the device in the interior of an automobile.

4. A device as claimed in claim 3 in which the mounting means comprise a clip adapted to engage a windshield visor.

5. A device as claimed in claim 2 in which the card engaging member is cylindrical.

6. A device as claimed in claim 1 including at least one spring means engaging the card engaging member for urging the sides of the channel into frictional engagement with the card.

7. A device as claimed in claim 6 in which the card engaging member has thereon at least one recess to allow for the attaching of the spring means.

* * * * *